US011023229B2

United States Patent
Zezula et al.

(10) Patent No.: US 11,023,229 B2
(45) Date of Patent: *Jun. 1, 2021

(54) SELF-LEARNING AUTOMATED TECHNIQUES FOR DETECTING THE USAGE OF SOFTWARE PACKAGES

(71) Applicant: International Business Machines Corporation, Armonk, NY (US)

(72) Inventors: Artur Zezula, Skawina (PL); Cezary Gorka, Cracow (PL); Agnieszka Matecka, Cracow (PL); Piotr P. Godowski, Cracow (PL); Norbert Chocko, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,712

(22) Filed: Oct. 8, 2019

(65) Prior Publication Data

US 2020/0042317 A1 Feb. 6, 2020

Related U.S. Application Data

(63) Continuation of application No. 16/021,852, filed on Jun. 28, 2018, now Pat. No. 10,509,650.

(51) Int. Cl.
*G06F 9/44* (2018.01)
*G06F 8/77* (2018.01)
*G06N 20/00* (2019.01)

(52) U.S. Cl.
CPC .............. *G06F 8/77* (2013.01); *G06N 20/00* (2019.01)

(58) Field of Classification Search
CPC .................................................. G06N 20/00
See application file for complete search history.

(56) References Cited

U.S. PATENT DOCUMENTS

| 5,673,315 | A | 9/1997 | Wolf | |
|---|---|---|---|---|
| 6,385,766 | B1 * | 5/2002 | Doran, Jr. | G06F 8/63 717/169 |
| 8,713,535 | B2 | 4/2014 | Malhotra et al. | |
| 9,395,966 | B1 * | 7/2016 | Watson | G06F 8/60 |

(Continued)

FOREIGN PATENT DOCUMENTS

JP 2017068481 A 4/2017

OTHER PUBLICATIONS

"Extended reporting of usage statistics", IBM, Mar. 2018, 5 pages.

(Continued)

*Primary Examiner* — Qamrun Nahar
(74) *Attorney, Agent, or Firm* — Richard Wilhelm; Edell, Shapiro & Finnan, LLC

(57) ABSTRACT

The systems and methods provided herein determine at least one first file system path related to a specific software package. A second file system path associated with a computing process running on the computer system is determined, and use of the specific software package on the computer system is detected based on comparing the first file system path with the second file system path. Thus, the present techniques determine the installation director(ies) of the application(s) and then compare active processes to determine whether an application is in use or is only installed.

20 Claims, 3 Drawing Sheets

(56) References Cited

U.S. PATENT DOCUMENTS

| | | | |
|---|---|---|---|
| 2009/0113397 A1 | 4/2009 | Wright, Sr. | |
| 2009/0327482 A1 | 12/2009 | Malhotra et al. | |
| 2010/0169874 A1* | 7/2010 | Izard | G06F 8/71 |
| | | | 717/170 |
| 2013/0166595 A1* | 6/2013 | Meketa | G06F 21/6218 |
| | | | 707/783 |
| 2017/0286095 A1 | 10/2017 | Grabska et al. | |
| 2020/0004531 A1 | 1/2020 | Zezula et al. | |

OTHER PUBLICATIONS

SWID Tags—Software Identification (SWID) Tags, retrieved from internet Feb. 2018, 1 page.

List of IBM Patents or Patent Applications Treated as Related dated Oct. 9, 2019.

* cited by examiner

SELF-LEARNING AUTOMATED TECHNIQUES FOR DETECTING THE USAGE OF SOFTWARE PACKAGES

CROSS REFERENCE TO RELATED APPLICATIONS

The following disclosure is based on and claims the benefit of and priority under 35 U.S.C. § 120 to U.S. patent application Ser. No. 16/021,852, filed Jun. 28, 2018, and the disclosure of which is incorporated in its entirety into the present continuation by reference.

BACKGROUND

1. Technical Field

Present invention embodiments relate to detecting the usage of a software package installed on a computer system, and more specifically, to automated self-learning techniques for detecting the usage of software packages.

2. Discussion of the Related Art

In software asset management, an administrator needs to know what types of software are installed, and whether the installed software is being used.

SUMMARY

According to embodiments of the present invention, self-learning and automated techniques are provided for determining usage of an application installed on a system. Path information related to the installation directory/directories of the application may be used in this determination.

The techniques comprise determining at least one first file system path related to a specific software package and a second file system path associated with a computing process running on the computer system. Use of the specific software package on the computer system is detected based on comparing the first file system path with the second file system path. Thus, the present techniques determine the installation director(ies) of the application(s) and then compare active processes to determine whether an application is in use or is only installed.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other features and advantages of the present disclosure will become more apparent.

DETAILED DESCRIPTION

Figure 1:
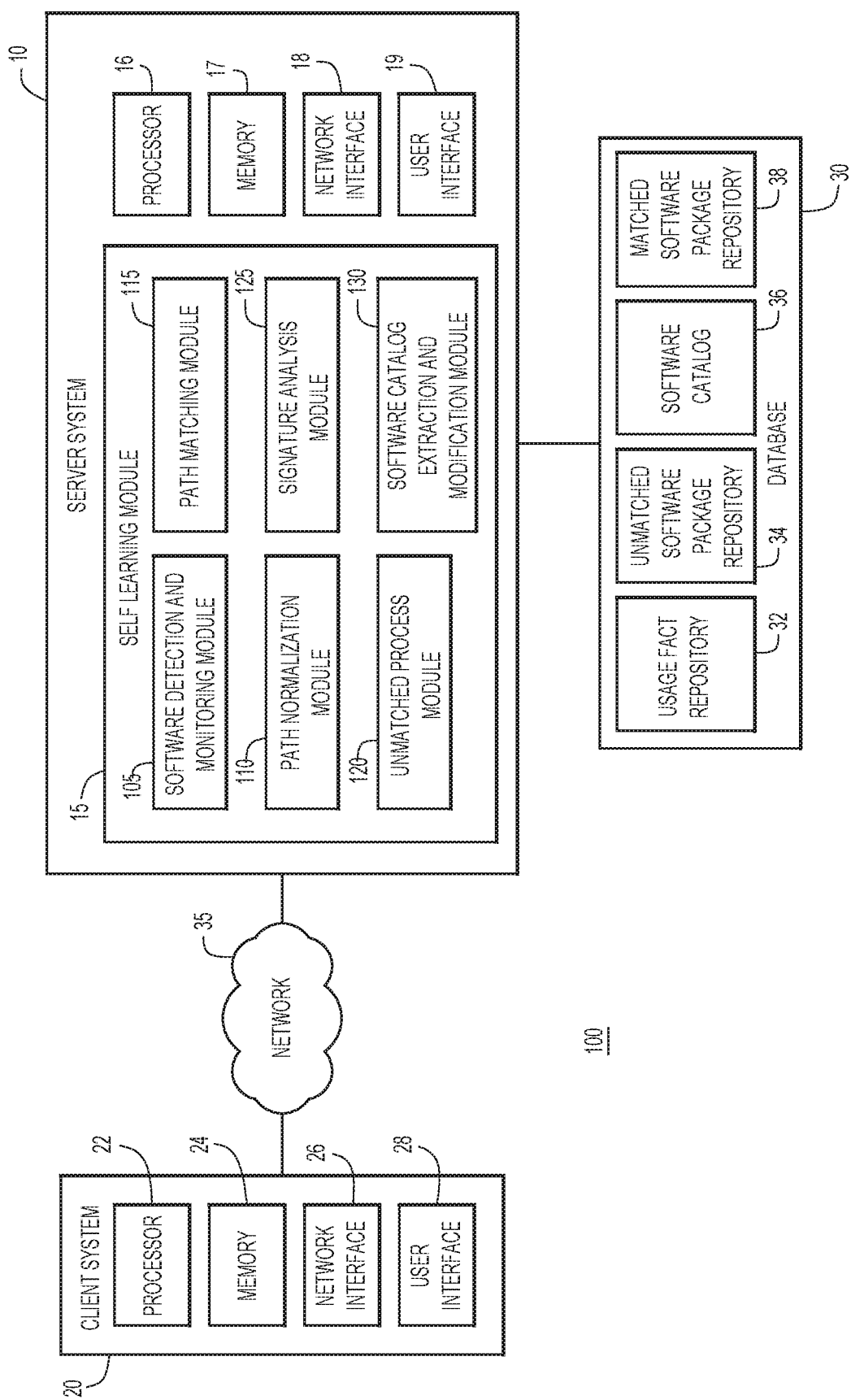
FIG. 1 is a block diagram of an example computing environment for self-learning and automated detection of software package usage in accordance with embodiments of the present disclosure.

An example environment 100 for use with present invention embodiments is illustrated in FIG. 1. Specifically, the environment includes one or more server systems 10, and one or more client or end-user systems 20. Server systems 10 and client systems 20 may be remote from each other and communicate over a network 35. The network may be implemented by any number of any suitable communications media (e.g., wide area network (WAN), local area network (LAN), Internet, Intranet, etc.). Alternatively, server systems 10 and client systems 20 may be local to each other, and communicate via any appropriate local communication medium (e.g., local area network (LAN), hardwire, wireless link, Intranet, etc.).

Client systems 20 enable users to view the results generated by server system 10. The server systems 10 may include a self-learning module 15 to automatically determine which software packages are being utilized, as described in additional detail below. Although a client server relationship is shown in FIG. 1, it is understood that other configurations are possible. For example, in an enterprise system, self-learning module 15 may be present on each endpoint. The results for each endpoint are then provided to a server system 10 for compilation and analysis.

A database system 30 may store various information for the analysis (e.g., a usage fact repository 32, an unmatched software package repository 34, a software catalog 36, matched software package repository 38, etc.). The database system may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface 28 (e.g., command line prompts, menu screens, etc.) to solicit information from users pertaining to the desired software package usage and analysis, and may provide reports including various analysis results (e.g., software package usage analytics, software package version information, location of installation, duplicate software packages, unmatched software packages, system wide or enterprise usage statistics, etc.).

Usage fact repository 32 may contain a list of usage facts comprising active processes and corresponding file paths (location) of the executable file that generates the active process. In some aspects, this information may be compiled over different periods of time, to indicate which processes are active in certain time windows. Unmatched software package repository 34 may comprise a list of unmatched active processes and may provide this to signature analysis module 125 for further analysis. A software catalog 36 may include a listing of installation paths for installed software packages. This may be updated by module 130, and as unmatched processes are identified, these are added to the software catalog. Additionally, module 130 may extract path information from the software catalog which is provided to path matching module 115 for analysis. Matched software package repository 38 may comprise a list of matched active processes.

Server systems 10 and client systems 20 may be implemented by any conventional or other computer systems preferably equipped with a display or monitor, a base (e.g., including at least one processor 16, 22, one or more memories 17, 24 and/or internal or external network interfaces or communications devices 18, 26 (e.g., modem, network cards, etc.)), optional input devices (e.g., a keyboard, mouse or other input device), user interface 19, 28, and any commercially available and custom software (e.g., server/client communications software, self-learning module 15, etc.).

Alternatively, one or more client systems 20 may detect the usage of software packages when operating as a stand-alone unit. In a stand-alone mode of operation, the client system stores or has access to the data (e.g., software catalogs, etc.), and includes self-learning module 15 to determine file paths of installed applications as well as file paths associated with actively running processes. The client system may compare the normalized file paths corresponding to the installed software package to the usage facts corresponding to the actively running processes to determine whether there is a match, e.g., a usage fact directory path falling within a subdirectory of the normalized file path. The graphical user (e.g., GUI, etc.) or other interface (e.g., command line prompts, menu screens, etc.) solicits information from a corresponding user pertaining to the desired analysis, and may provide reports including analysis results.

Self-learning module 15 may include one or more modules or units to perform the various functions of present invention embodiments described herein. The various modules (e.g., software detection and monitoring module 105, path normalization module 110, path matching module 115, unmatched process module 120, signature analysis module 125, software catalog extraction and modification module 130, etc.) may be implemented by any combination of any quantity of software and/or hardware modules or units, and may reside within memories 17, 24 of the server and/or client systems for execution by processors 16, 22.

In some embodiments, the present techniques and systems are compatible with ISO 19770-2 enabled products which utilizes an ISO SWID standard for tagging software. For example, ISO SWID may act as an identification tag for a software package. The ISO SWID indicates the installation directory for a software package, and this installation directory may be compared against active processes running from the directory/subdirectories. Thus, using identification tags, software packages may be identified locally, on the system in which such packages are installed.

In general, the SWID tag comprises a structured metadata format for describing a software product, which may include the software product name, the product version, file extension, the organization which owns the product, the content of the software product, the relationships to other software products, and other descriptive information about the software product's lifecycle. In some aspects, a file may have a file extension that ends in ".swidtag".

Software detection and monitoring module 105 comprises functionality to: (1) detect software installation paths (e.g., based on a software catalog or a SWID tag), and to (2) monitor active processes to generate a usage fact repository 32 that may include usage statistics pertaining to the detected software packages. This information may be analyzed, in an automated and self-learning manner to determine the usage of the software package based on the operations of FIGS. 2-3.

Path normalization module 110 normalizes the software installation paths. Module 110 may identify the root or top-level directory of the installed application, and may normalize the path such that the top-level directory is maintained and subdirectories are removed. The ISO standard specifies that the installation of software follow the pattern /opt/abc/lmt/iso-swid, wherein iso-swid is a subdirectory corresponding to the particular application being installed.

Path matching module 115 compares active application file paths to software installation paths, which may be normalized by module 110. Normalization allows the system to match all possible versions of the application, and to self-learn new versions of the applications.

Unmatched process module 120 identifies active processes that were not matched by path matching module 115. This module may pass a list of the unmatched processes to signature analysis module 125 for further analysis.

Signature analysis module 125 may be used to identify unmatched active processes. This module may compare a name of the active process (or any other suitable active process information) to identify the unmatched active process, e.g., by comparing to a usage signature catalog. Signature analysis module may also normalize the unmatched active processes to facilitate comparison. In some cases, a match may be positive provided that there is sufficient similarity between the terms being compared, e.g., the terms do not have to match exactly, but should be similar or have some other feature to identify the active process.

Software catalog extraction and modification module 130 may maintain a list of installation paths corresponding to active processes. For processes involving SWID tags, the software catalog extraction module may not be needed, however, for catalog based processes, this module may generate and maintain a list of active processes and corresponding installation paths for future analysis. Once the installation file path is identified, this information along with the active process name may be provided to module 130 for inclusion into the software catalog. Module 130 may also extract file paths from the software catalog 36, which are used to compare file paths of active processes with installation paths.

Figure 2:
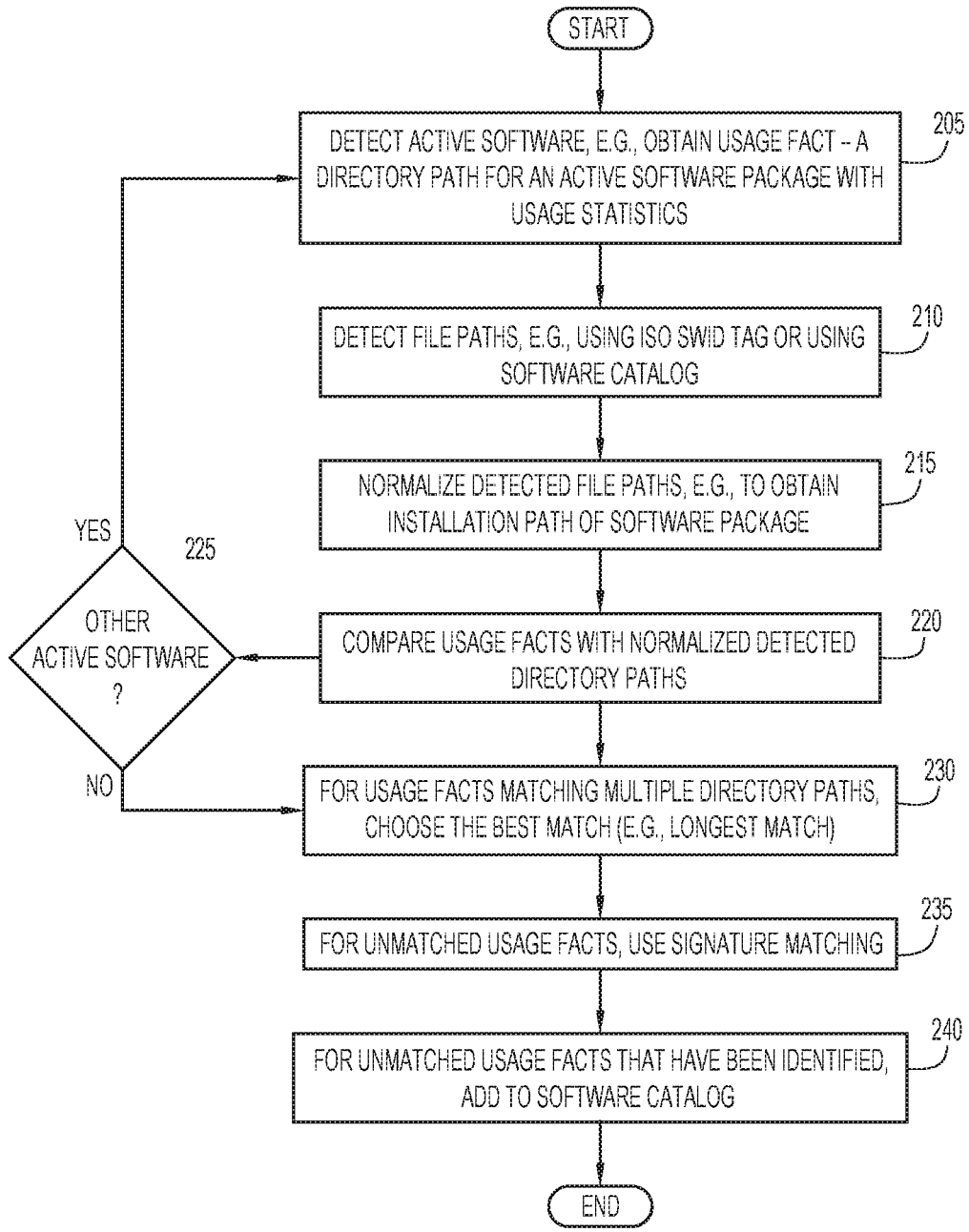
FIG. 2 is a detailed flowchart of operations for self-learning and automated detection of software package usage using software catalogs or tags, according to embodiments of the present disclosure.

FIG. 2 shows example operations performed by the modules listed above. With reference to software detection and monitoring module 105, at operation 205, active software processes are detected to determine usage facts. The system may monitor actively running processes on a computer, and for each active process, may extract the file path corresponding to the active process. In some cases, the system may identify which processes are part of the operating system of the computer, and may exclude these from the analysis, as these processes are fundamental to the operation of the system, and will generally be active whenever the computer is operating. In other cases, the system may evaluate all active processes.

The system may detect new active processes at periodic intervals or as these processes are launched, e.g., by another program or a user. The system may store a list of active processes as these processes are detected, and from a subsequent scan, may identify which processes are newly active (e.g., from a user or other process launching a new process) or no longer active (no longer detectable). The system may interface with a module (e.g., custom developed or part of the operating system, in some cases, similar to a task manager) that monitors active processes to obtain such information.

In some cases, a usage fact may correspond to a directory path (including the name of the active software package) with usage statistics. At operation 210, file paths are detected, using the ISO SWID tag (or any other suitable equivalent) or using a software catalog. For example, based on the ISO standard, SWID files may end in a file-specific extension (e.g., ".swidtag") to allow ease of identification of SWID tag files and the corresponding directory or file path in which the SWID tag is located. The SWID tag file may have a location of /opt/abc/lmt/iso-swid/filename.swidtag, which may yield the directory or file path /opt/abc/lmt/iso-swid/. This information may be provided as inputs to other modules.

With reference to path normalization module 110, and at operation 215, each detected directory path or file path from operation 210 may be normalized (e.g., to the root directory with regard to installation of the software package). For example, /opt/abc/lmt/iso-swid may be normalized to /opt/abc/lmt/. This module removes subdirectories so that the root or top level of the program installation directory is generated.

With reference to path matching module 115, and at operation 220, for each detected usage fact corresponding to an active process, the usage fact may be compared with the normalized detected directory path to determine if the usage fact (in particular, the file path for an active software package or program) is within (matches) the normalized detected directory path. The normalized detected directory path contains the installation path of the software package as determined by the SWID tag or software catalog. For example, a usage fact comprising the installation path of a binary file /opt/abc/lmt/bin/lmt.bin may be compared to the normalized detected directory path from operation 215, which is /opt/abc/lmt/. Here, the path /opt/abc/lmt/bin/lmt.bin is within a subdirectory of /opt/abc/lmt and a comparison between these two paths leads to a match. As another example, the path /var/opt/abc/lmt/lmt.bin is within /var/opt/abc/lmt, and a comparison between these two paths leads to a match.

Thus, the system has the capability to identify and extract or self-learn newly installed software packages based on identifying a tag associated with the installed software package, and extracting the file path corresponding to the location of the tag. In some cases, the tag is detectable or recognizable by the system at the file directory level (e.g., a particular file type extension, e.g., such as .swidtag). In other cases, all files within a specified directory of a file system are indicative of installed software, and all such files are considered. In still other cases, the system may scan file type extensions in order to identify files associated with running processes (e.g., .bin, .exe, etc.); in some cases, the system may scan files up to a certain depth of the directory (e.g., within 4 or 5 subdirectories deep) so as not to scan the entire system.

In some aspects, installation paths may be obtained using, e.g., SQL queries Usage_fact.path such as "path %" or by identifying the installation path defined inside the ISO SWID file for a given software package.

At operation 225, if there are multiple active software packages, the process repeats at operation 205, until all active software packages have been analyzed according to this process.

At operation 230 and also with regard to the path matching module 115, for usage facts matching multiple directory paths (e.g., cases in which the same process is used by two different software packages), the best match may be selected. In some cases, the longest installation path is selected as the best match. For example, Java may be running as a Java.exe process both as a primary software and as an embedded software, e.g., by a program that runs using Java. In some cases, it may be desirable to correlate Java usage with the embedded Java component and not with the primary Java installed product. For example, in some cases, the longer installation path may correlate with the embedded Java component and the shorter installation path may correlate with the primary Java component. Without installation path information, it is not possible to discern which Java process correlates with which process (e.g., primary or embedded). In cases in which multiple installation paths have the same length and refer to the same installation directory, all matches are generally kept.

With reference to unmatched process module 120, and at operation 235, unmatched usage facts (processes not matching a normalized directory path) may be processed through behavioral signature matching. Unmatched processes include active software packages without a corresponding installation path, incomplete or out of date catalog entries that no longer correspond to newer or upgraded software packages, cases in which SWID tags for different processes are placed in a common location, other active processes not installed according to ISO standards, etc. Likewise, detected normalized directories or detected directories that do not have a corresponding process match, may indicate that the software package is not active. Behavioral signature matching involves techniques to match based on similarity and therefore matches may not be exact.

Signature analysis module 125 may also normalize signature matches for usage facts that are matched with multiple software names. For example, signature analysis module may also perform normalization and/or filtering operations, including excluding software processes matched with a file path, excluding software reporting unique path if still more than one match, and keeping the remaining matches.

In some aspects, the signature analysis module 125 may use a software catalog with predefined usage signatures as well as custom signatures created by users to perform behavioral signature matching. If only one instance of a software process is discovered on a given endpoint, path information may be ignored. In general, signature analysis module 125 may identify processes that are not run from the directory in which the corresponding software package is installed. Thus, behavioral signature matching using this module may not be possible when software is installed in many locations.

As an example, software A is matched through path based matching to process P1 and is additionally matched by usage signature to process P2. Software B is matched by usage signature to process P2, which is the same as software A. In this case, process P2 is assigned only to software B as software A has already assigned process P1.

As another example, software A is matched through path based matching to process P1, and software B is matched through path based matching to process P1. In this case, process P1 is assigned to both software A and software B.

In yet another example, process P1 is executed from DIR_P1 /opt/dir_p1/ and is not matched using path based matching. Software A is installed in directory DIR_A /opt/dir_a/ and has a usage signature named process P1. Therefore, process P1 is matched by signature to software A.

For operation 240 and with regard to software catalog extraction and modification module, unmatched usage facts that have been identified by module 125 may be added to the software catalog. Alternatively, this module may also extract files paths from a software catalog and may provide the extracted file paths to the path matching modules 115 for further analysis.

Figure 3:
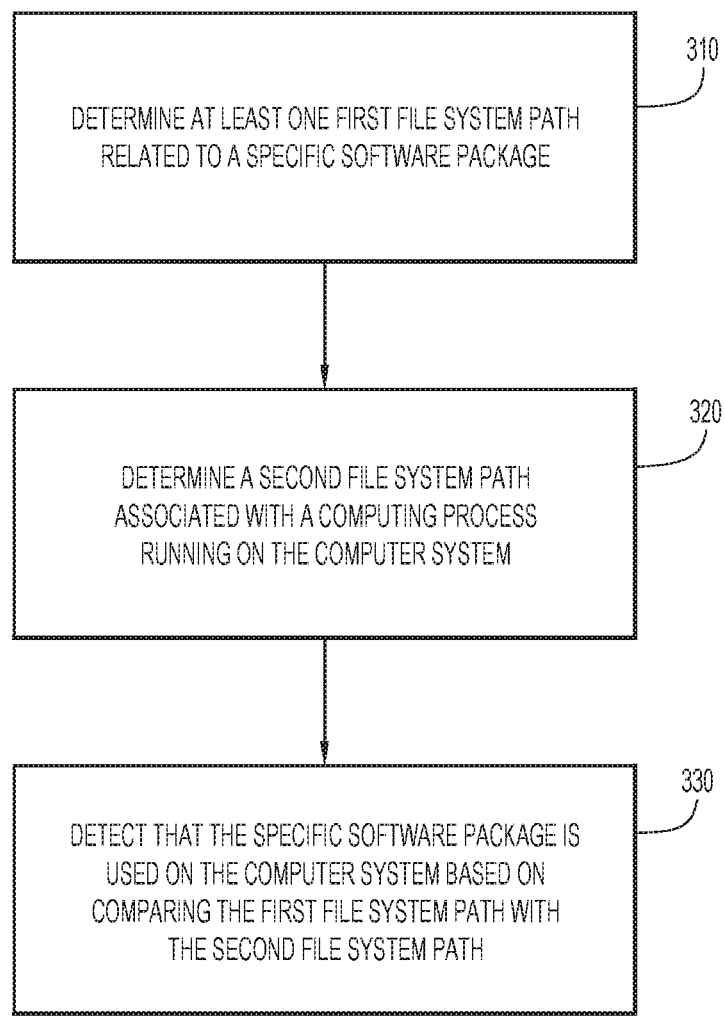
FIG. 3 is a high level flowchart of operations for self-learning and automated detection of software package usage, according to embodiments of the present disclosure.

FIG. 3 shows high level operations of detecting active software packages that have been installed. At operation

310, at least one first file system path related to a specific software package is determined. At operation 320, a second file system path associated with an active computing process running on the computer system is determined. At operation 330, the specific software package is detected to be used on the computer system based on comparing the first file system path with the second file system path.

Methods and systems are provided herein, which provide a way to identify new software installations in an automated manner, and to identify which installations are active. Further, the techniques are adaptable to changing software names and versions, as the techniques may self-learn installed software package names in an automated manner.

These techniques can be extended across enterprise systems to make decisions regarding software installation and to better utilize software resources. In an enterprise setting, the present techniques may be used to gather software package usage information from all monitored endpoints. This usage information may be stored in a centralized location and analyzed to determine usage of installed software. The techniques may be rerun on a periodic basis in order to account for changes in the network (e.g., addition or removal of new endpoints), software upgrades on an endpoint, software removal on an endpoint, file path changes on an endpoint, etc. Accordingly, any of the aforementioned changes may be made, and the present techniques may be used to gather the updated information in an automated, self-learning manner.

The approaches described herein have several advantages. For example, applications not installed in a common directory may be detected using software identification tags. Additionally, identification of software packages is not limited to those that are visible on the system list of active software processes. Further, for unmatched software processes, the present approaches may use a custom software catalog, which may include user defined entries to identify software processes, and is typically stored locally to the computer on which the software processes are active.

In some aspects, the techniques may also be applied to system registries or as part of a deep file system analysis (e.g., traversing through a large number of nested subdirectories to analyze more locations within the computer system) to obtain file path information of installed software packages. Parsing through the registry may provide information about installation directories or individual files.

In some aspects, when the system determines that an installed file is not active, the system may record in a database that the file is not active. Whether at periodic intervals or based on detecting a new active process (e.g., a user or other process launching a new file), the system may determine that the file has not been active for an interval of time defined by a user (e.g., a week, one month, three months, one year). In some embodiments, the system may automatically remove or uninstall the software package from the system, e.g., to free up a license for another user in an enterprise environment or to free up resources on a computer. In other cases, the system may provide a notification to a network administrator regarding manual uninstallation of the software. In still other cases, if a shared license among a group of users is being heavily utilized, the system may send a notification to the network administrator regarding high usage of the software, e.g., to indicate that additional licenses are needed to optimize productivity.

In other aspects, the active process list and arguments passed to the software which generated the active process list may be captured and examined.

It will be appreciated that the embodiments described above and illustrated in the drawings represent only a few of the many ways of implementing embodiments for automatically determining usage of software packages in a self-learning manner.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, self-learning module, client software, etc.). These systems may include any types of monitors and input devices (e.g., keyboard, mouse, voice recognition, etc.) to enter and/or view information.

It is to be understood that the software (e.g., self-learning module 15, including software detection and monitoring module 105, path normalization module 110, path matching module 115, unmatched process module 120, and signature analysis module 125, software catalog extraction and modification module 130, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., self-learning module 15, including software detection and monitoring module 105, path normalization module 110, path matching module 115, unmatched process module 120, and signature analysis module 125, software catalog extraction and modification module 130, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., usage fact repository 32, unmatched software package repository 34, software catalog 36, matched software package repository 38, etc.). The database system may be implemented by any number of any conventional or other databases, data stores or storage structures (e.g., files, databases, data structures, data or other repositories, etc.) to store information (e.g., usage fact repository 32, unmatched software package repository 34, software catalog 36, matched software package repository 38, etc.). The database system may be included within or coupled to the server and/or client systems. The database systems and/or storage structures may be remote from or local to the computer or other processing systems, and may store any desired data (e.g., usage fact repository 32, unmatched software package repository 34, software catalog 36, matched software package repository 38, etc.).

The present invention embodiments may employ any number of any type of user interface (e.g., Graphical User Interface (GUI), command-line, prompt, etc.) for obtaining or providing information (e.g., usage fact repository 32, unmatched software package repository 34, software catalog 36, matched software package repository 38, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., enterprise usage analytics, usage at an endpoint, matched software packages, unmatched software packages, etc.).

The present invention embodiments are not limited to the specific tasks or algorithms described above, but may be utilized for any application in which a file specific tag can be used to derive file path information which is them compared to file path information for active processes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting a usage of a software package installed on a computer system, the method comprising:
   determining, via a processor, a first file system path of the computer system related to a specific software package;
   monitoring, via the processor, actively running computing processes on the computer system;
   determining, via the processor, a second file system path of the computer system for an executable file associated with a computing process actively running on the computer system;
   normalizing, via the processor, the first file system path for the specific software package to remove subdirectories specific to installation of the specific software package from the first file system path;
   detecting, via the processor, use of the specific software package is used on the computer system based on comparing the first file system path for the specific software package with the second file system path for the executable file; and
   uninstalling, via the processor, the specific software package in response to being inactive for an interval of time.

2. The method of claim 1, wherein the first file system path is extracted from a software catalog database, the software catalog database describing a predefined set of software packages.

3. The method of claim 1, wherein the second file system path is a process directory and the first file system path is a root level directory, and wherein the second file system path has at least one subdirectory within the first file system path.

4. The method of claim 1, further comprising:
   detecting a software identification tag file within a file system of the computer system; and
   determining the first file system path based on a file system path where the software identification tag file is located.

5. The method of claim 4, further comprising:
   determining an identifier of the specific software package based on content of the software identification tag file, and storing the first file system path into a software catalog database together with a calculated identifier of the specific software package.

6. The method of claim 1, wherein the method comprises:
determining that a further computing process running on the computer system cannot be detected by comparing a third file system path associated with the further computing process and the first file system path with each other, and
identifying a software package used on the computer system based on behavioral signature matching.

7. The method of claim 1, wherein the first file system path for the specific software package is normalized such that a top-level-directory of the first file system path is maintained.

8. The method of claim 1, wherein comparing the first file system path with the second file system path returns multiple matches, indicating that the specific software package is active as a primary program and as an embedded program; and
resolving which active process refers to the primary program and which active process refers to the embedded program based on the length of the match.

9. A system for detecting a usage of a software package installed on a computer system, comprising at least one processor configured to:
determine a first file system path of the computer system related to a specific software package;
monitor actively running computing processes on the computer system;
determine a second file system path of the computer system for an executable file associated with a computing process actively running on the computer system;
normalize the first file system path for the specific software package to remove subdirectories specific to installation of the specific software package from the first file system path;
detect use of the specific software package on the computer system based on comparing the first file system path for the specific software package with the second file system path for the executable file; and
uninstall the specific software package in response to being inactive for an interval of time.

10. The system of claim 9, wherein the first file system path is extracted from a software catalog database, and the software catalog database describes a predefined set of software packages.

11. The system of claim 9, wherein the second file system path is a process directory and the first file system path is a root level directory, and wherein the second file system path has at least one subdirectory within the first file system path.

12. The system of claim 9, wherein the at least one processor is further configured to:
detect a software identification tag file within a file system of the computer system; and
determine the first file system path based on a file system path where the software identification tag file is located.

13. The system of claim 12, wherein the at least one processor is further configured to:
determine an identifier of the specific software package based on content of the software identification tag file, and
store the first file system path into a software catalog database together with a calculated identifier of the specific software package.

14. The system of claim 9, wherein the at least one processor is further configured to:
determine that a further computing process running on the computer system cannot be detected by comparing a third file system path associated with the further computing process and the first file system path with each other, and
identify a software package used on the computer system based on behavioral signature matching.

15. The system of claim 9, wherein the first file system path for the specific software package is normalized such that a top-level-directory of the first file system path is maintained.

16. The system of claim 9, wherein comparing the first file system path with the second file system path returns multiple matches, indicating that the specific software package is active as a primary program and as an embedded program, and wherein the at least one processor is further configured to resolve which active process refers to the primary program and which active process refers to the embedded program based on the length of the match.

17. A computer program product for detecting a usage of a software package installed on a computer system, the computer program product comprising one or more computer readable storage media collectively having program instructions embodied therewith, the program instructions executable by a processor to:
determine a first file system path of the computer system related to a specific software package;
monitor actively running computing processes on the computer system;
determine a second file system path of the computer system for an executable file associated with a computing process actively running on the computer system;
normalize the first file system path for the specific software package to remove subdirectories specific to installation of the specific software package from the first file system path;
detect use of the specific software package on the computer system based on comparing the first file system path for the specific software package with the second file system path for the executable file; and
uninstall the specific software package in response to being inactive for an interval of time.

18. The computer program product of claim 17, wherein the first file system path is extracted from a software catalog database, and the software catalog database describes a predefined set of software packages.

19. The computer program product of claim 17, wherein the second file system path is a process directory and the first file system path is a root level directory, and wherein the second file system path has at least one subdirectory within the first file system path.

20. The computer program product of claim 17, wherein the program instructions are executable to:
detect a software identification tag file within a file system of the computer system; and
determine the first file system path based on a file system path where the software identification tag file is located.

* * * * *